US008804599B2

(12) United States Patent
Yanagihara et al.

(10) Patent No.: US 8,804,599 B2
(45) Date of Patent: Aug. 12, 2014

(54) WIRELESS NETWORK AND TERMINAL, AND NETWORK CONFIGURATION METHOD AND DEVICE

(75) Inventors: Kentarou Yanagihara, Hyogo (JP); Hiroshi Nishimura, Osaka (JP); Yuki Kubo, Osaka (JP); Masanori Nozaki, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 295 days.

(21) Appl. No.: 13/187,029

(22) Filed: Jul. 20, 2011

(65) Prior Publication Data

US 2012/0082065 A1  Apr. 5, 2012

(30) Foreign Application Priority Data

Oct. 1, 2010  (JP) .................................. 2010-224198

(51) Int. Cl.
  *H04B 7/14* (2006.01)
(52) U.S. Cl.
  USPC .......................................................... 370/315
(58) Field of Classification Search
  CPC ............... H04W 84/18–84/22; H04W 28/021; H04W 4/02–4/025; H04W 28/0226; H04W 40/20
  USPC ................................. 370/310–350; 455/4–17
  See application file for complete search history.

(56) References Cited

U.S. PATENT DOCUMENTS

| 2004/0033778 | A1 | 2/2004 | Fonseca et al. | |
| 2009/0175238 | A1* | 7/2009 | Jetcheva et al. | 370/329 |
| 2009/0285165 | A1* | 11/2009 | Berglund et al. | 370/329 |
| 2010/0177684 | A1* | 7/2010 | Kore et al. | 370/328 |
| 2010/0195560 | A1 | 8/2010 | Nozaki et al. | |
| 2013/0070646 | A1* | 3/2013 | Myers et al. | 370/255 |

FOREIGN PATENT DOCUMENTS

| JP | 2005537706 A | 12/2005 |
| JP | 2009-055301 A | 3/2009 |
| JP | 2010178145 A | 8/2010 |

OTHER PUBLICATIONS

Jie Teng et al., "Athermal Silicon-on-insulator ring resonators by overlaying a polymer cladding on narrowed waveguides", Optics Express, vol. 17, No. 17, Aug. 17, 2009, pp. 14627-14633.

Mutsunori Uenuma et al., "Temperature-independent silicon waveguide optical fiber", Optics Letters, vol. 34, No. 5, Mar. 1, 2009, pp. 599-601.

* cited by examiner

*Primary Examiner* — Andrew Chriss
*Assistant Examiner* — Kenan Cehic
(74) *Attorney, Agent, or Firm* — Rabin & Berdo, P.C.

(57) ABSTRACT

A tree topology in a multi-hop wireless network is configured by having each node other than the root node select a parent node within direct communication range, thereby becoming a child node of the selected parent node. Neighboring nodes provide selection values such as routing costs and local structural information indicating the existing topology in their vicinities, including parent-child relationships. The selection of the parent node is based on the received selection values, but the local structural information is used to bias the selection in favor of neighboring nodes with at least one other child node. This selection strategy reduces the number of parent nodes in the network and enables more nodes to operate as end nodes, which can then conserve power by carrying out sleep control.

10 Claims, 9 Drawing Sheets

FIG. 4

| NEIGHBORS | PARENT-CHILD | NEXT NEIGHBORING NODES |
|---|---|---|
| 102 | | 101 (PARENT), 103, 106, 107, 108 |
| 103 | | 102, 104, 107 (PARENT), 108, 109 |
| 104 | | 103, 105, 108, 109 (PARENT), 110 |
| 107 | PARENT | 101 (PARENT), 102, 103, 106, 108 (CHILD), 111, 112, 113 |
| 109 | | 103, 104, 105 (CHILD), 108, 110 (CHILD), 113 (PARENT), 114, 115 (CHILD) |
| 112 | | ...... |
| 113 | | ...... |
| 114 | | ...... |

| NUMBER OF NEIGHBORING NODES | 1 | 2 | 3 | 4 | 5 | 6 | ≧7 |
|---|---|---|---|---|---|---|---|
| SECOND ADDED COST | 6 | 5 | 4 | 3 | 2 | 1 | 0 |

WIRELESS NETWORK AND TERMINAL, AND NETWORK CONFIGURATION METHOD AND DEVICE

BACKGROUND OF THE INVENTION

1. Field of the Invention

The present invention relates generally to a wireless network such as sensor network with a tree topology, and more particularly to the selection of parent nodes in the network.

2. Description of the Related Art

Various methods have been developed for configuring a wireless network in which nodes that are not directly linked communicate in a series of hops through intermediate nodes. Unlike wireline networks, wireless networks permit a node to transmit signals to all its neighboring nodes with no additional wiring cost, so the multi-hop communication routes are often selected on the assumption that each node can communicate with all its neighboring nodes.

This assumption, however, leads to increased power consumption at the nodes. Because each node may receive signals from any of its neighboring nodes, the receiving component of the node must be kept operating and ready to receive at all times, so the receiving component constantly consumes power.

In an alternative method, the nodes (wireless terminals) of the network are divided into relaying nodes and non-relaying nodes, and communication is routed only through the relaying nodes.

In a method described in Japanese Patent Application No. 2009-55301, a non-relaying wireless terminal referred to as an end device switches off the power of its transmitting and receiving components during sleep periods to reduce power consumption. Each non-relaying wireless terminal selects one neighboring relaying wireless terminal, communicates only with the selected wireless terminal, and communicates only at restricted timings, thereby reducing power consumption. The role of each wireless terminal (relaying or non-relaying) is fixed, however, and cannot be changed. This creates a problem if a new wireless terminal is added to the network in a position where the only neighboring wireless terminals are non-relaying wireless terminals.

Similar problem are apt to occur if a relaying wireless terminal drops out of the network, or if a link between a relaying wireless terminal and another wireless terminal becomes inoperable. This makes the network vulnerable to battery failure and various other types of failure that may leave some non-relaying wireless terminal unable to communicate with any relaying wireless terminal. Such a network lacks reliability.

SUMMARY OF THE INVENTION

An object of the present invention is to reduce overall power consumption in a wireless network while ensuring reliable communication.

The invention provides a novel wireless terminal functioning as a node in a wireless network with a tree topology. To configure the tree topology, each node in the wireless network other than the root node in the tree selects a neighboring node as a parent node, and functions as a child node of the parent node. Communications sent from the root node are relayed from parent node to child node until they reach their destination. Communications sent toward the root node are routed from child node to parent node.

The novel wireless terminal stores structural information about a local part of the wireless network, and exchanges at least some of the structural information with its neighboring nodes. The novel wireless terminal also receives selection values transmitted by its neighboring nodes. Both the stored structural information and the selection values are used in selecting a parent node. Although the selection process may be based partly on the magnitudes of the selection values, in addition, neighboring nodes having at least one child node other than the novel wireless terminal, as indicated by the stored structural information, are favored over neighboring nodes having no other child nodes.

In one embodiment, before a parent node is selected, the received selection values are processed by adding an enhancement value that makes nodes having at least one child node other than the novel wireless terminal more likely to be selected as the parent node, and the parent node is selected on the basis of the modified selection values. The modified selection value of the selected parent node is then used as part of the selection value transmitted to neighboring nodes.

An enhancement value that makes nodes having more child nodes or more neighboring nodes more likely to be selected as the parent node may also be added.

In another embodiment, a candidate group of nodes having at least one child node is selected from among the neighboring nodes, and then the parent node is selected from the candidate group on the basis of the received selection values.

In some embodiments, the novel wireless terminal also selects a back-up parent node.

The nodes that are selected as parent nodes of other nodes in the network function as relaying nodes. Giving preference to nodes with other child nodes for selection as parent nodes reduces the number of relaying nodes in the network and increases the number of non-relaying nodes, as compared with selection of parent nodes solely on the basis of the received selection values.

Non-relaying nodes can conserve power by transmitting and receiving only at designated times and operating in a low-power mode at other times. Increasing the number of non-relaying nodes therefore reduces the total power consumption of the network.

Network communication is reliable because any node can be selected as a parent node and operate as a relaying node. When a failure occurs, the network can reconfigure itself by making new parent node selections.

The invention also provides a network including wireless terminals of the novel type, a method and device for configuring a tree-topology network by selecting parent nodes on the basis of selection values in a way that favors nodes with at least one other child node, and a machine-readable medium on which machine-executable instructions for selecting parent nodes in this way are recorded.

BRIEF DESCRIPTION OF THE DRAWINGS

In the attached drawings:

FIG. 4 is a table illustrating the local structural information held by each wireless terminal in the first embodiment;

DETAILED DESCRIPTION OF THE INVENTION

Figure 1A:
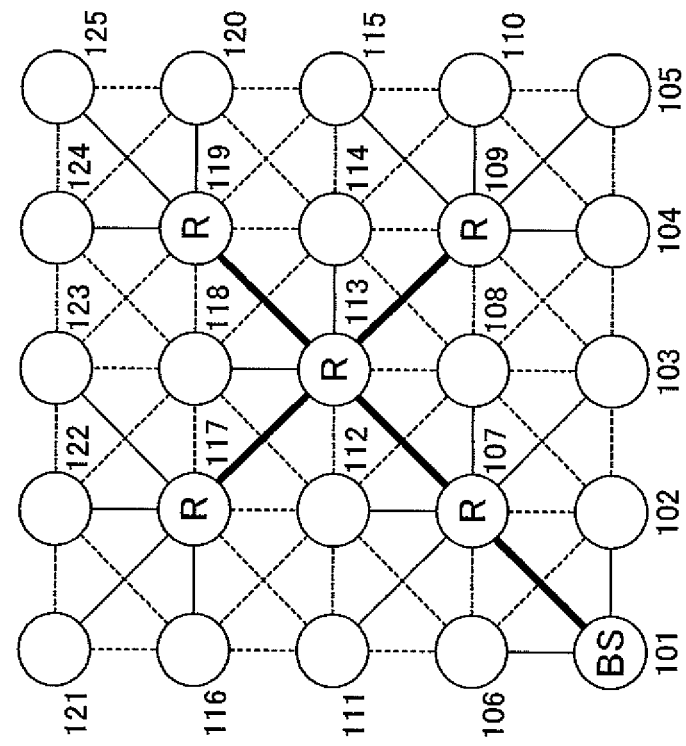
FIGS. 1A and 1B illustrate two exemplary wireless network structures.

Embodiments of the invention will now be described with reference to the attached drawings, in which like elements are indicated by like reference characters.

First Embodiment

In the first embodiment, the wireless terminals constituting the wireless network configure the network by executing a parent terminal decision program installed in each wireless terminal. The wireless network in this embodiment may be any type of wireless multi-hop network that can operate with a tree topology. A particular example is a sensor network.

Figure 1B:
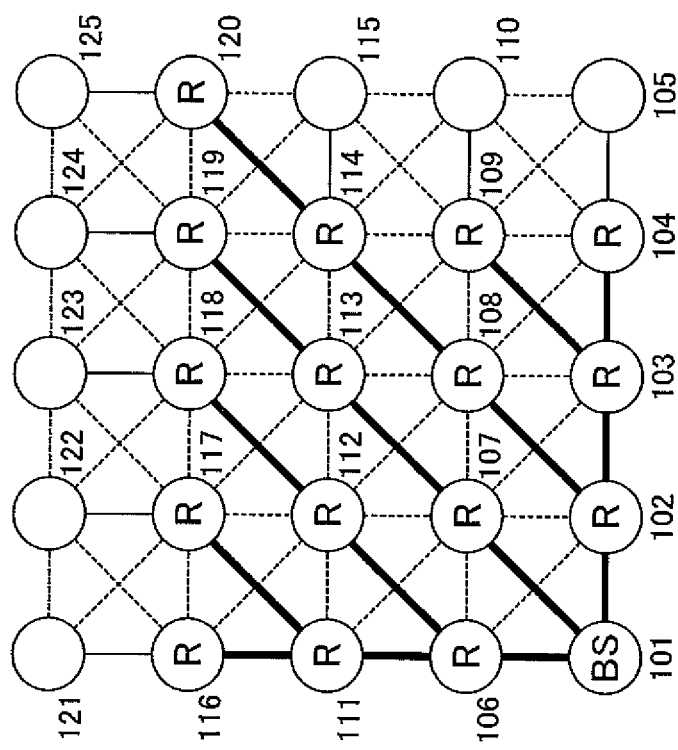

FIGS. 1A and 1B are two examples of wireless networks with identical numbers (twenty-five) of wireless terminals (also referred to as nodes below) 101 to 125 and identical physical layouts but different tree topologies. In both topologies wireless terminal 101 is the root node and functions as a base station (BS) through which the network is connected on a constant basis to an external network. The wireless terminals indicated by the letter R operate as relaying nodes, and are referred to as routers below. In the wireless network in FIG. 1A, there are sixteen routers 102-104, 106-109, 111-114, and 116-120. In the wireless network in FIG. 1B, there are five routers 107, 109, 113, 117, 119. The wireless terminals without BS or R indications are non-relaying nodes (also referred to as end devices below). The wireless network in FIG. 1A includes eight end devices 105, 110, 115, 121-125. The wireless network in FIG. 1B includes nineteen end devices 102-106, 108, 110-112, 114-116, 118, 120-125.

The lines linking the wireless terminals in FIGS. 1A and 1B indicate that the two linked terminals are within wireless communication range of each other. A bold solid line indicates a communication link between two routers, and a thin solid line indicates a communication link between a router and an end device. Information such as sensor data and commands is transmitted on these links. Dotted lines indicate links used only for sending and receiving selection values, referred to below as cost data, and local structural information, referred to below as status information.

Each end device in FIG. 1A or 1B communicates directly with just one other node, either a router or the root node 101, to which it is linked by a solid line. Each router communicates with one parent node and at least one child node. In relaying information toward the root node 101, the router receives the information from a child node and sends the information to its parent node. In relaying information away from the root node, the router receives the information from its parent node and sends the information to one or more of its child nodes.

In FIG. 1A, router 113 has router 107 as its parent node and router 119 as its only child node. In FIG. 1B, router 113 has router 107 as its parent node and routers 109, 117, 119, and end devices 114, 118 as its child nodes.

In the first embodiment, the end devices carry out sleep control. The routers also have a sleep control function, but they do not use it, because if a relaying node were to go to sleep, network communication might be delayed. Overall network power consumption can accordingly be reduced by increasing the number of nodes that operate as end devices and decreasing the number of routers. From the standpoint of overall power consumption, the network topology in FIG. 1B, which has fewer routers and more end devices, is preferable to the topology in FIG. 1A.

The network topologies in FIGS. 1A and 1B are set up by establishing the parent-child links indicated by the solid lines between neighboring nodes. All nodes 102-125 other than the root node 101 are capable of operating as either routers or end devices. The network is established by having each of nodes 102 to 125 select a parent node, which thereby becomes a router. The point of the first embodiment is to ensure that these selections produce the type of wireless network in FIG. 1B, rather than the type shown in FIG. 1A.

In a sensor network, for example, the node with which the wireless terminals need to communicate by sending and receiving data is the root node 101, or a host device (not shown) to which the root node 101 is connected. The non-root nodes in the network may be called on to relay such data, but no one of them is likely ever to be the final destination of data transmitted by another one of them, and the network is not designed for such transmissions. In FIG. 1A, if node 120 were to send data to its neighboring node 124, for example, the data would have to be routed on a lengthy path including nodes 120, 114, 108, 102, 101, 107, 113, 119, 124. Similarly, in FIG. 1B, if node 115 were to send data to its neighboring node 120, the data would have to be routed on a path including nodes 115, 109, 113, 119, 120. In a sensor network, however, such paths are never used. The tree topology allows efficient transmission of data from the root node 101 (or its host device) to all the other nodes, and the host device can efficiently collect sensor data from the entire network. The sensor data collections in a sensor network take place at restricted timings, so at other times, it is preferable for the wireless terminals functioning as end devices to be put to sleep.

For this reason, the wireless network in the first embodiment assumes a tree topology and attempts to reduce the number of routers.

It will be appreciated that the number of nodes in the network in this embodiment is not limited to twenty-five, and the node arrangement is not limited to the grid arrangement shown in FIGS. 1A and 1B.

Figure 2:
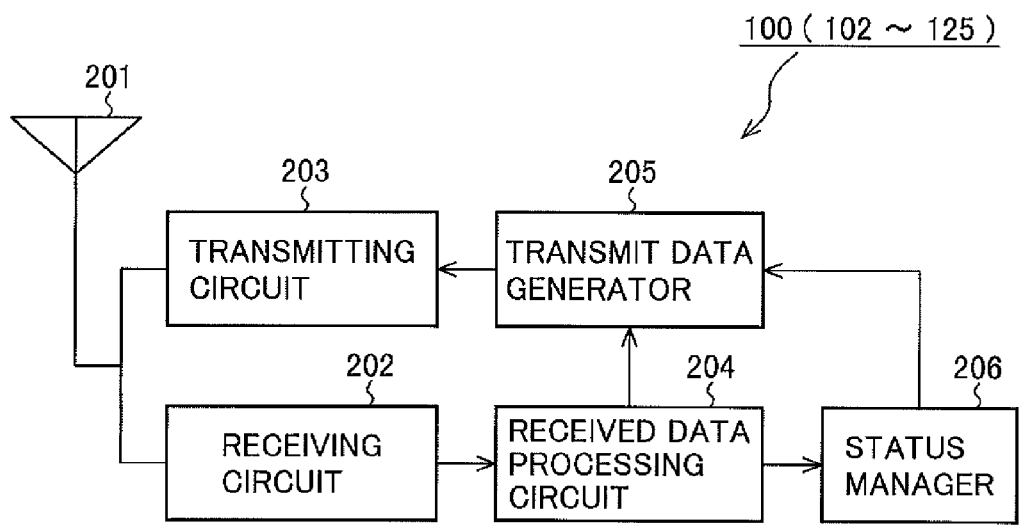
FIG. 2 is a block diagram illustrating the internal structure of a wireless terminal in a first embodiment of the invention.

Referring to FIG. 2, the generic wireless terminal 100 (representing any of nodes 102 to 125) includes an antenna 201, a receiving circuit 202, a transmitting circuit 203, a received data processing circuit 204, a transmit data generator 205, and a status manager 206. At least the received data processing circuit 204, transmit data generator 205, and status manager 206 may be implemented by execution of appropriate software by a general-purpose computing device such as a central processing unit (CPU) or digital signal processor (DSP).

As noted above, the nodes 102-125 other than the root node 101 can operate as either routers or end devices. The internal structure shown in FIG. 2 is applicable to all of them. The root node 101 in the tree topology may also have the same internal structure, but if it need not operate as a relaying node, its signal relaying line may be omitted from the structure in FIG. 2.

The antenna 201 captures incoming radio signals, passes them to the receiving circuit 202, and radiates radio signals output from the transmitting circuit 203. In FIG. 2 the same antenna 201 is used for both transmitting and receiving, but it is also possible to have a receiving antenna and a separate transmitting antenna. In the first embodiment, the positional relationships of the neighboring nodes are unrestricted, and accordingly the antenna 201 is omni-directional.

The receiving circuit 202 demodulates the radio signal from the antenna 201 to obtain digital data (received data), and sends the digital data to the received data processing circuit 204. The receiving circuit 202 includes a preamplifier, a filter, and other well-known circuitry. If the wireless network in the first embodiment uses direct digital modulation, the antenna 201 carries out direct digital demodulation. If a digitally modulated signal is further modulated onto a carrier signal in a particular frequency channel, the receiving circuit 202 carries out both channel demodulation and digital demodulation. The transmitting circuit 203 carries out corresponding modulation processing.

In this embodiment, the data sent and received between the wireless terminal 100 and its neighboring nodes are classified into at least three types: communication data, status notification data, and cost notification data. Communication data are passed between nodes to reach a single destination node or, in multicast mode, a plurality of destination nodes. Status notification data are transmitted to notify neighboring nodes of the position of the transmitting node in the network, its operating status, and other such information. Cost notification data are sent to enable neighboring nodes to calculate transmission costs and select parent nodes. Status and cost notification data do not contain information defining a particular destination node; they are received and processed by any node within direct communication range.

The received data processing circuit 204 carries out predetermined processing on communication data, status notification data, and cost notification data received from the receiving circuit 202. The received data may be sent in packets, in which case the received data processing circuit 204 depackets the received data before carrying out the predetermined processing. If the received data are status notification data or cost notification data from a neighboring node, the received data processing circuit 204 passes the data to the status manager 206. If the received data processing circuit 204 receives communication data and the wireless terminal 100 itself is a destination node, the received data processing circuit 204 notifies the status manager 206 that it has received communication data from a neighboring node. If the received data are communication data destined to another node, the received data processing circuit 204 sends the data to the transmit data generator 205 and notifies the status manager 206 that it has received communication data to be relayed to another node. The status manager 206 then has the data sent to the final destination node, or to the next relaying node on the path to the final destination node. The final destination node or next relaying node may be indicated in the received data.

If the wireless terminal 100 is an end device, it never relays received communication data destined to another node. If the wireless terminal 100 is a router but the destination node is not subordinate to the wireless terminal 100 in the tree topology, the wireless terminal 100 does not relay the received communication data.

The transmitting circuit 203 converts outgoing data (communication data, status notification data, or cost notification data) received from the transmit data generator 205 to a radio signal and transmits the signal from the antenna 201. As noted above, the transmitting circuit 203 may operate by direct digital modulation, or may create a digitally modulated signal (digital modulation) and then modulate this signal onto a carrier signal in a particular frequency channel (channel modulation). The transmitting circuit 203 includes a filter, a power amplifier, and other well-known circuitry.

The transmit data generator 205 generates outgoing data (communication data, status notification data, or cost notification data) to be given to the transmitting circuit 203. The transmit data generator 205 uses information about neighboring nodes and their transmission costs, obtained from the status manager 206, to generate status notification data and cost notification data to be sent to the neighboring nodes. When the wireless terminal 100 itself generates data to be sent to a particular destination, making the wireless terminal 100 the source node of the data, the transmit data generator 205 generates communication data including the data. When the transmit data generator 205 receives data to be relayed, it obtains information indicating the node to which the data should be relayed (the next relaying node or the final destination node), and regenerates the communication data to be sent to that node. The transmit data generator 205 periodically generates status notification data under control of the status manager 206.

The status manager 206 manages information about the operating status of its own node, information about neighboring nodes referred to as local structural information or local tree information, and cost information for its neighboring nodes. The status manager 206 receives status notification data and cost notification data from the received data processing circuit 204 and updates the operating status information, local tree information, and cost information that it manages as necessary. From time to time the status manager 206 reviews the local tree information and neighboring node cost information. For example, it reviews its choice of parent node (the next higher directly linked node in the tree topology) and checks whether its own node should function as a router or an end device. When its own node functions as an end device, the status manager 206 carries out power control (sleep control) for circuits such as the transmitting circuit 203 and receiving circuit 202.

The status manager 206 is implemented by, for example, the execution of parent-node decision instructions by a computing device including a CPU.

Figure 3:
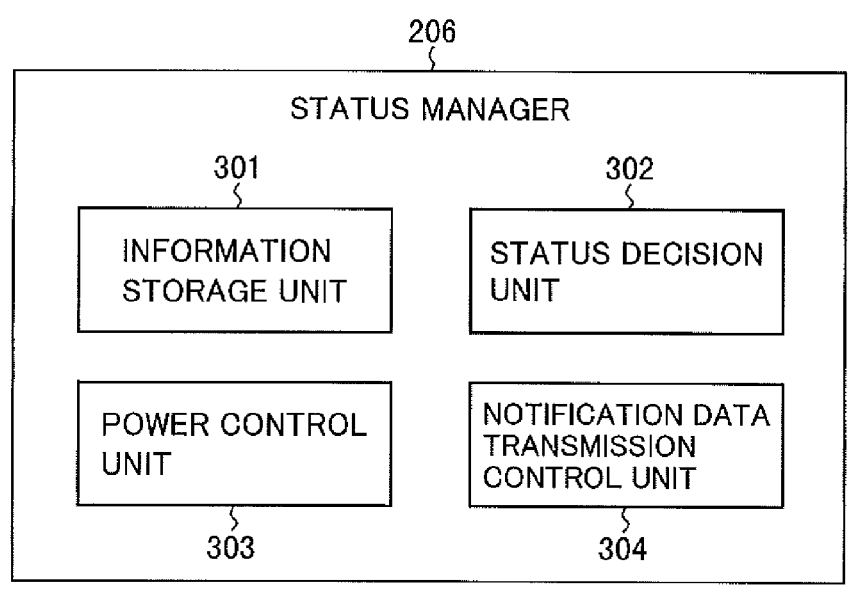
FIG. 3 is a block diagram illustrating the detailed structure of the status manager in FIG. 2.

Referring to FIG. 3, the status manager 206 includes an information storage unit 301, a status decision unit 302, a power control unit 303, and a notification data transmission control unit 304. When the status manager 206 is implemented by a computing device and software instructions, FIG. 3 represents its functional configuration.

The information storage unit 301 holds the local tree information, the operating status of its own node, and the neighboring node cost information.

Neighboring node costs are selection values to be compared with each other in order to choose a parent node. A neighboring node with a smaller selection value is more likely to be chosen as the parent node. How the neighboring node costs are determined will be described later.

The local tree information held by the information storage unit 301 in the first embodiment includes the identification numbers of its own neighboring nodes (nodes within direct communication range) and the identification numbers of next neighboring nodes (nodes within direct communication range of the neighboring nodes) and their parent-child relationships, if any, which are known from the status notification data received from the neighboring nodes. In a variation of the first embodiment, the local tree information described above is extended to include more distant nodes, or even the entire tree.

The local tree information in FIG. 4 is held by the information storage unit 301 of wireless terminal 108 in the tree-topology network shown in FIG. 1B. The information storage units in other nodes on the network hold different local tree information, corresponding to their different positions in the network.

In FIG. 4, the table has three columns or fields: a neighbor field in which the identification number of a directly neighboring node of wireless terminal 108 is entered; a parent-child field that indicates whether the neighboring node is the parent node or a child node, or neither; and a next neighboring node field in which the identification numbers of the neighboring nodes of the directly neighboring node and their parent-child relationships to the directly neighboring node are entered.

In FIG. 4, the wireless terminal 108 has directly neighboring nodes 102-104, 107, 109, and 112-114, of which node 107 is its parent node and none are child nodes. Accordingly, wireless terminal 108 is an end device. The nodes listed in the neighbor field are the nodes from which status notification data have been received. Among the information held in the information storage unit 301, the data in the neighbor field and parent-child field are transmitted in outgoing status notification data, and they are entered in the next neighboring field of the local tree information table at each receiving node, in the row (record) of the node that sent the status information data. It can be seen from FIG. 4 that node 109, a directly neighboring node of wireless terminal 108, has wireless terminals 103 to 105, 108, 110, and 113 to 115 as its neighboring nodes, wireless terminal 113 as its parent node, and wireless terminals 105, 110, and 115 as child nodes.

Although the local tree information is represented in table form in FIG. 4, it will be appreciated that the same information may be represented in a graph form or network form (not shown) instead.

If the data in the neighbor field and the parent-child field are sent together in the status notification data, the local tree topology of the network can be recognized out to a two-hop range. If the data in the neighbor field, parent-child field, and next neighboring node field are all sent together in the status notification data, the tree topology of the network can be recognized out to a wider range.

The status decision unit 302 uses the local tree information, neighboring node costs, and other information held in the information storage unit 301 to decide whether its own node should operate as a router or an end device and to decide which of its neighboring nodes to use as a parent node. The status decision unit 302 makes these decisions periodically. The information storage unit 301 continues to hold the local tree information before these decisions as well as holding the updated local tree information (or information indicating the updates) after the decisions, and the status decision unit 302 makes its decisions based on both the before and after information. The decision procedure will be described later.

When its own node operates as an end device, the power control unit 303 carries out power control (sleep control) for the receiving circuit 202 and transmitting circuit 203 of the node. Parts of the received data processing circuit 204, transmit data generator 205, and status manager 206 may also be sleep-controlled.

The notification data transmission control unit 304 is controlled by a built-in timer to periodically give the information in the neighbor field and parent-child field to the transmit data generator 205, and has the transmit data generator 205 generate status notification data and transmit the data.

Figure 5:
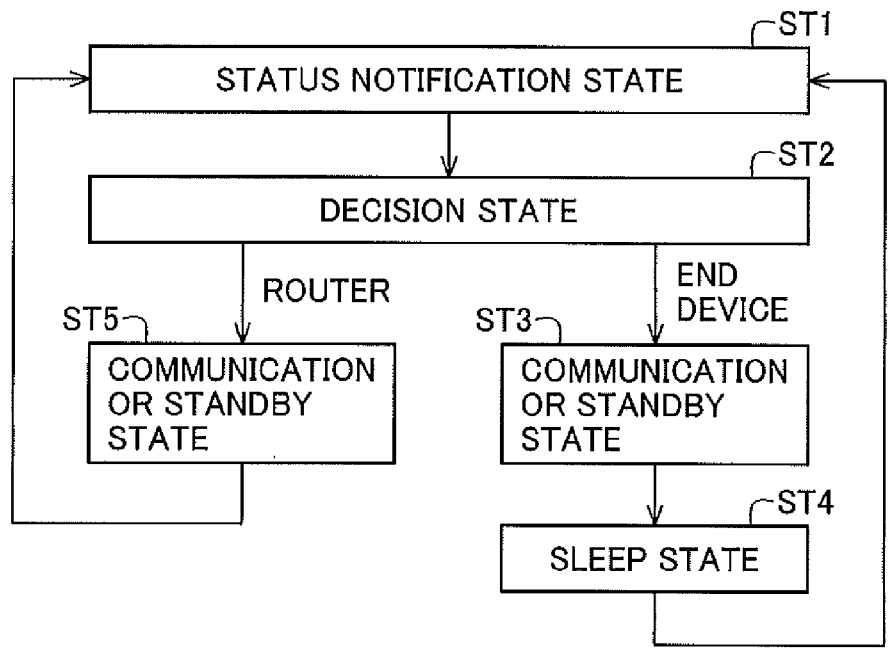
FIG. 5 is a state transition diagram for a wireless terminal in the first embodiment.

The state transitions at each node will now be described with reference to FIG. 5. Information indicating these states is stored as operating status information in the information storage unit 301 of the node.

Each of the nodes in the network periodically enters a status notification state (ST1) in which it exchanges status notification data with its neighboring nodes. An end device enters this state from the sleep state (ST4). For example, if the status notification data are to be sent and received during a prescribed period (e.g., fifteen seconds) starting at prescribed times (e.g., every hour on the hour and on the half-hour), end nodes wake up at these prescribed times. To avoid having all nodes start transmitting at once, nodes having identification numbers ending with the digit i (where is from 0 to 9) start transmitting their status notification data i seconds after the prescribed time. Conventional collision avoidance methods may be used.

After the status notification state ends, each node transits to a decision state (ST2) in which it selects its parent node and decides whether to operate as a router or an end device.

A node that decides to operate as an end device then transits to a communication or standby state (ST3) and remains in that state for a given period, after which it returns to the sleep state (ST4) until the next prescribed time. A node that decides to operate as a router transits to a generally similar communication or standby state (ST5), and remains in that state until the next prescribed time.

Figure 6:
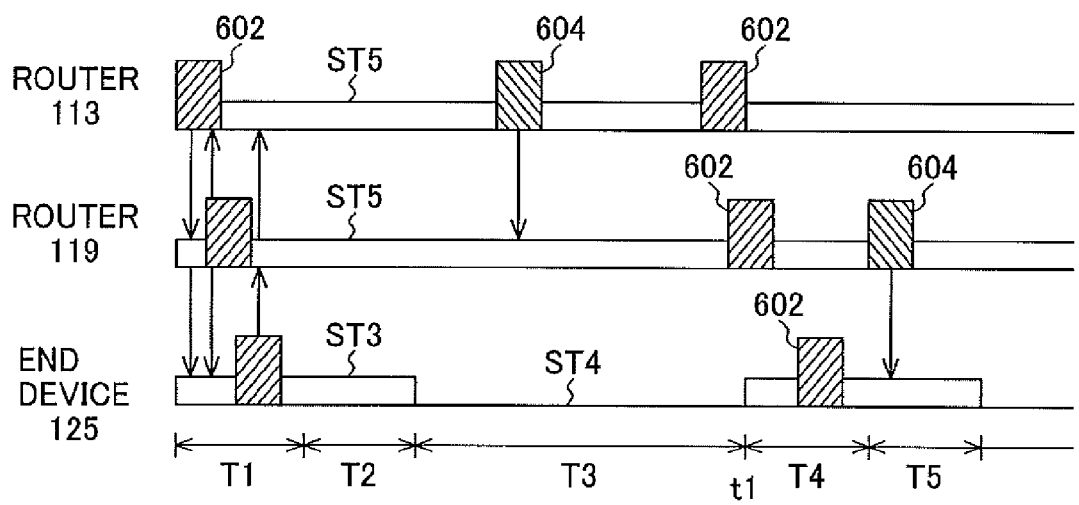
FIG. 6 is a timing diagram illustrating the relations between state transitions of three wireless terminals and the transmission and reception of status notification data and communication data.

FIG. 6 is a timing diagram illustrating the relationships between the state transitions and the sending and reception of the status notification data and communication data at three nodes 113, 119, 125 in the wireless network in FIG. 1B. Nodes 113 and 119 operate as routers and node 125 operates as an end device.

These three nodes 113, 119, 125 exchange status notification data 602 during a given period T1, after which each node selects a parent node and decides individually whether to operate as a router or an end device. If the same decisions are made as before, node 125, continuing to operate as an end device, remains in the communication or standby state ST3 for a given period T2, and then enters the sleep state ST4 and remains inactive during the period T3 until the next prescribed time t1. Nodes 113 and 119, continuing to operate as routers, enter the communication or standby state ST5 and remain in that state during the period (T2+T3) until the next prescribed time t1.

While in the communication or standby state during period T3 in FIG. 6, node 113 receives communication data 604 addressed to end node 125 from upstream router node 107. Node 113 promptly relays the communication data to downstream router node 119, which is also in the communication or standby state ST5. Routers never go to sleep, so data transfers between them proceed without delays. Since end node 125 is currently asleep, however, node 119 waits until node 125 wakes up, finishes exchanging status notification data 602 during period T4, enters the communication or standby state in period T5, and then relays the communication data 604 to node 125.

FIG. 6 illustrates a downstream communication data transfer, away from the root node in the tree topology. Upstream communication data transfers toward the root node are carried out similarly. In the upstream case, any router that receives communication data can immediately transfer it to the next upstream router. An end device can send communication data to an upstream router during the communication or standby period following wake-up from the sleep state ST4 and termination of the status notification state ST1.

As described later, to enable the nodes to determine their parent nodes, each node must transmit cost notification data. If such cost notification data are sent together with status notification data, the cost notifications take place within the state transitions shown in FIG. 5.

The operations by which each node in the wireless network in the first embodiment chooses its parent node will now be described. The link cost between any two neighboring nodes is assumed to be '1' in this description. In practice the link costs may differ depending on the communication band used, the distances between neighboring nodes, and other factors.

Basically, each node obtains cost information from all of its neighboring nodes and selects the node with the least cost as its parent node. Before other aspects of the parent-node decision operation are described, this basic operation of selecting a parent node only on the basis of neighboring node costs will be described. FIG. 1A is an example of a network topology resulting from this basic parent-node decision operation.

The root node 101 periodically sends (broadcasts) cost notification data designating a cost of '0'. In the exemplary network shown in FIG. 1A, nodes 102, 106, 107 receive this cost notification data. A node that receives cost notification data indicating cost '0' always uses the root node 101 as its parent node, so nodes 102, 106, 107 choose the root node 101 as their parent node.

If a node other than the root node 101 receives cost notification data from another neighboring node, it stores the cost obtained by adding the node-to-node link cost to the cost designated by the cost notification data as the cost of the neighboring node that sent the cost notification data, and if this cost is smaller than the smallest cost that it has stored so far, it decides to use that neighboring node as its parent node. A node other than the root node 101 also adds the node-to-node link cost to the cost in the cost notification data received from its parent node, then generates and periodically transmits (broadcasts) cost notification data designating the resulting sum to its neighboring nodes.

More specifically, each of the nodes 102, 106, 107 that chose to use the root node 101 as their parent node transmits cost notification data indicating a cost '1' obtained by adding the cost '1' of the link with the root node 101 to the cost '0' designated by the cost notification data received from the root node 101. The cost notification data transmitted by node 102, for example, arrive at the root node 101 and nodes 103 and 106-108.

Among these nodes, nodes 103 and 108 receive the cost notification data from node 102 before they have chosen a parent node, so they both choose node 102 as their parent node. They also store the cost '2' obtained by adding the cost '1' of the link with node 102 to the cost '1' indicated by the cost notification data as the cost they will transmit in their own cost notification data.

When nodes 106 and 107 receive the cost notification data transmitted by node 102, they perform the same addition to obtain '2' as the cost of node 102 and compare this neighboring node cost with the cost '1' of their existing parent node (the root node) 101. Since the cost of the existing parent node is smaller than the cost of node 102, these nodes decide to maintain their existing parent-child relationships with the root node 101.

Figures 7, 8:
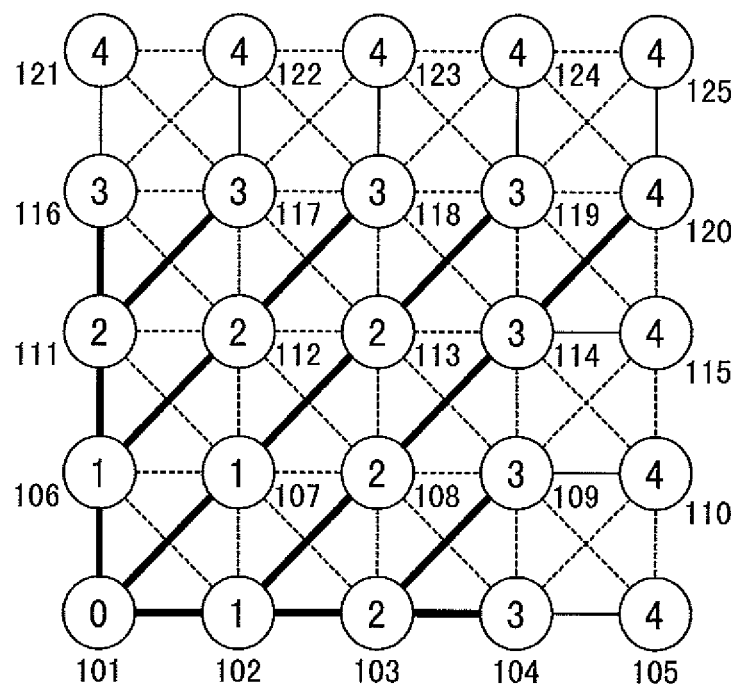
FIG. 7 illustrates path costs from the base station to each wireless terminal in the first embodiment.
FIG. 8 is a table illustrating an exemplary allocation of second added costs corresponding to the number of neighboring terminals in the first embodiment.

In FIG. 7, the value in each circle (node) indicates the cost included in the cost notification data transmitted from that node to the neighboring nodes when each of the nodes on the wireless network in FIG. 1A carries out the basic operation of choosing a parent node based on neighboring node costs, which represent link costs to the neighboring nodes added to the path costs from the base station up to the neighboring nodes.

As noted above, the wireless network in FIG. 1A has fewer end devices than the wireless network in FIG. 1B, so it consumes more power. The purpose of the first embodiment is to increase the number of end devices and reduce the number of routers. Reducing the number of routers means that a typical router becomes a parent node to more wireless terminals. In the first embodiment, parent nodes are decided from the neighboring node cost obtained as described above and added costs that have the effect of reducing the number of routers.

The first added cost of a node depends on the number of child nodes of the node, or the presence or absence of a child node. The first added cost increases as the number of child nodes decreases. As an example, the first added cost will be assumed to be '0' in the absence of a child node and '1' in the presence of a child node. A node having one or more child nodes functions as a router. The first added cost makes it is easier for a router node to be selected as a parent by other nodes.

In the state just after system start-up, for example, when no child nodes have been defined yet, the first added cost need not be applied. Use of the first added cost can begin once an initial network topology has been established. The same is true of the third added cost, described later.

The second added cost of a node corresponds to the number of neighboring nodes of the node. The second added cost increases as the number of neighboring nodes decreases. The table in FIG. 8 shows an exemplary assignment of second added costs, in which the cost is '6' for a single neighboring node and decreases in steps of '1' as the number of neighboring nodes increases, becoming '0' for seven or more neighboring nodes. The effect of the second added cost is to make it easier for a node having more neighboring nodes to be chosen as a parent node, thereby tending to cluster more child nodes on a single router.

Figure 9:
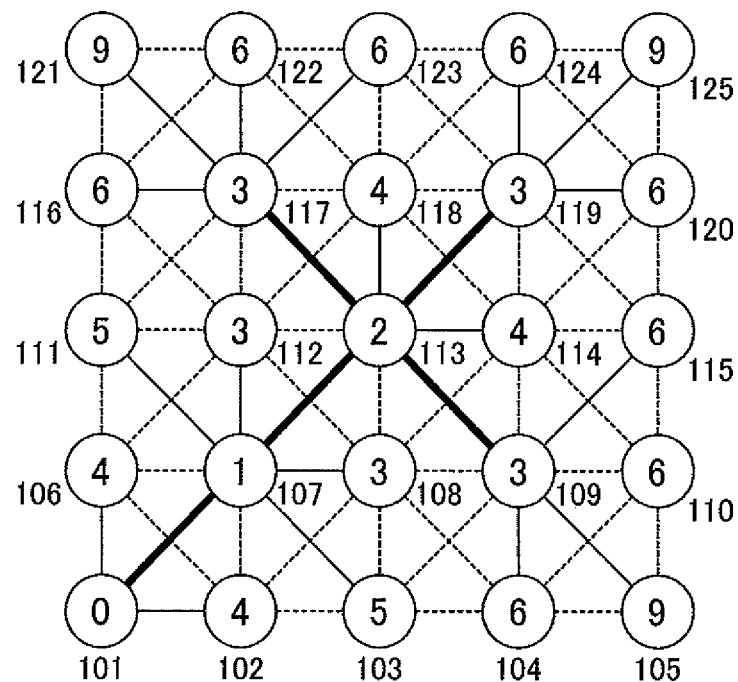
FIG. 9 shows the result of adding first and second costs to the path costs in FIG. 7.

The results of adding the first and second added costs to the path cost from the root node 101 are shown in FIG. 9.

For example, node 106 has a total cost of '4', which is the sum of the path cost '1', a first added cost of '1' because it has no child nodes, and a second added cost of '2' because it has five neighboring nodes. As another example, node 118 has a total cost of '4', which is the sum of the path cost '3', a first added cost of '1' because it has no child nodes, and a second added cost of '0' because it has eight neighboring nodes. As a further example, node 116 has a total cost of '6', which is the sum of the path cost '3', a first added cost of '1' because it has no child nodes, and a second added cost of '2' because it has five neighboring nodes.

It will be assumed now that node 118 has received cost notification data indicating the costs shown in FIG. 9 from its eight neighboring nodes 112-114, 117, 119, 122-124. The link costs to these neighboring nodes are all '1', so node 118 chooses a node that transmitted minimum cost notification data, in this case node 113, as its parent node. The wireless network configuration resulting from this parent-node decision procedure at nodes 102 to 125 is shown in FIG. 1B.

In the above example, only first and second added costs are used, but a third added cost may be used as well. The third added cost, like the first added cost, depends on the number of child nodes, but unlike the first added cost, it also depends on whether the child nodes are end devices or routers.

The third added cost for an end device is, for example, '10'. The value of the third added cost for a router differs depending on the number of its child nodes that are also routers. For example, the third added cost is '0' for a router with three or more child routers, '1' for a router with two child routers, '2' for a router with a single child router, and '3' for a router with no child router.

The purpose of the third added cost is to prevent an end device from being used as a router, if possible, and to rank the routers in a way that minimizes the number of routers.

Figure 10:
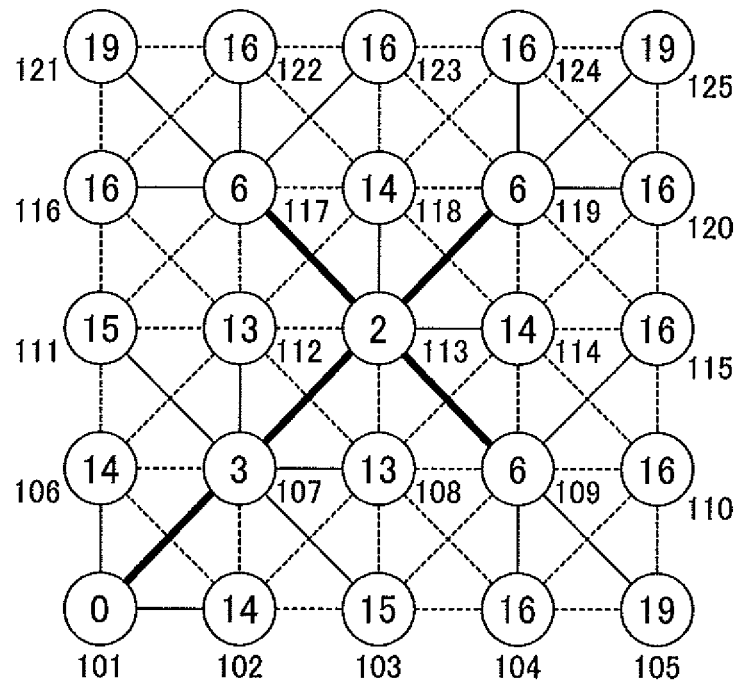
FIG. 10 shows the result of adding third costs to the costs in FIG. 9.

FIG. 10 shows the results of adding the third added cost to the costs (sum of the path cost, first added cost, and second added cost) shown in FIG. 9.

For example, node 106, being an end device, has a third added cost of '10' and a total cost of '14'. Node 107, being a router with one child router, has a third added cost of '2' and a total cost of '3'. Node 113, being a router with three child routers, has a third added cost of '0' and a total cost of '2'.

Figure 11:
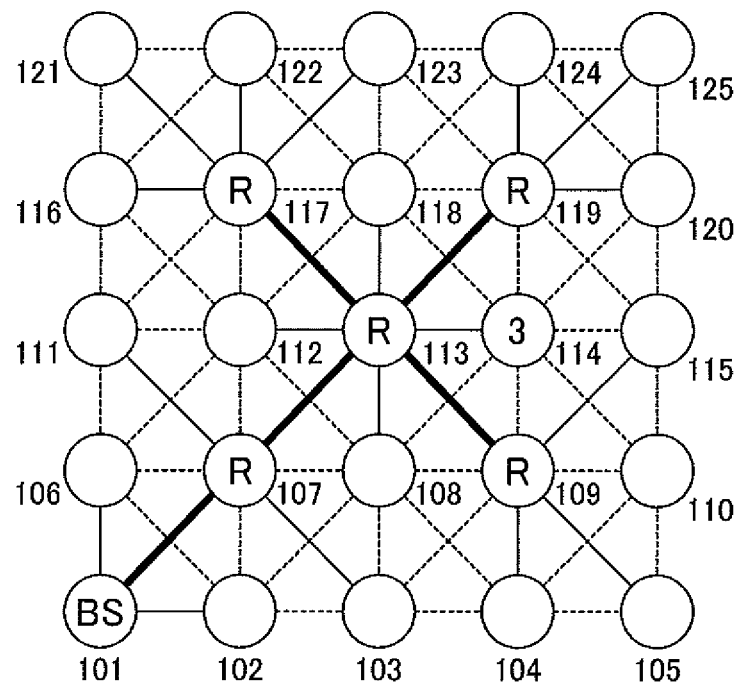
FIG. 11 illustrates a wireless network topology configured according to the costs in FIG. 10.

The wireless network topology shown in FIG. 11 is obtained by performing minimum-cost parent-node decisions at nodes 102 to 125 individually, using the costs shown in FIG. 10. This topology differs from the topology in FIG. 1B in that the parent node of nodes 108 and 112 is node 113, instead of node 107. The number of routers in the entire wireless network is still five, identical to the number in FIG. 1B, so substantially the same overall reduction in power consumption is obtained.

In the first embodiment, each of the nodes in the wireless network needs to transmit cost notification data and its neighboring nodes need to receive the cost notification data. Some of the nodes function as end devices and carry out sleep control. In order to ensure the reception of cost notification data by an end device, the transmitting and receiving timing of the cost notification data may be predetermined, as with the status notification data. For example, cost notification data may be transmitted together with status notification data. It is also contemplated that the root node may use communication data to notify each end device of a time period for transmitting and receiving cost notification data, and that the end devices may refrain from entering the sleep state during the designated period.

Based on failure of a node to receive expected status notification data, cost notification data, or other data from a neighboring node from which such data had been successfully received in the past, or failure to receive such data for a substantially longer time than usual, or failure to receive such data from the neighboring node successively a prescribed number of times, for example, it is possible for the node to detect problems such as an inoperative neighboring node, or an inoperative link with a neighboring node. A node that detects such a problem at a neighboring node treats the neighboring node as lost. If the lost node is its parent node, the node with the next smallest cost among the neighboring nodes that have not been lost is chosen as a new parent node.

For example, in the state where node 122 has chosen to use node 117 as its parent node in FIG. 9, if the link with node 117 is lost, node 122 choose a new parent node by comparing the costs of its other neighboring nodes 116, 118, 121, 123, and decides to use node 118, which has the smallest cost ('4') as its new parent node. Node 118 now has a child node, so its cost changes from '4' to '3'. If the problem is not a link failure but the complete removal of node 117 from the network, the number of neighboring nodes changes, so node 122 must receive recalculated costs from its neighboring nodes 116, 118, 121, 123 and compare these costs to choose a new parent node.

The first embodiment minimizes the power consumption of the wireless network as a whole by letting each node choose its parent node on the basis of a cost scheme in which the cost of a node is reduced as the number of its child nodes increases and as the number of its neighboring node increases (and also, in one version of the scheme, as the number of child router nodes increases). This scheme reduces the number of routers in the entire wireless network, and increases the number of end devices that perform sleep control.

Each of the wireless terminals in this wireless network can be used as either an end device or a router, and network function can be maintained by changing the network configuration responsive to events such as loss of wireless links, run-down batteries at wireless terminals, and device failures, so a more reliable network can be established. That is, even if such problems disable some of the wireless terminals in the wireless network in the first embodiment, the reliability of communication among the surviving wireless terminals can be maintained.

Second Embodiment

The wireless terminal, parent-node decision method, and wireless network in a second embodiment will now be described.

The second embodiment differs from the first embodiment in how a wireless terminal or node chooses its parent node.

In this embodiment, as in the first embodiment, each wireless terminal or node in the wireless network transmits and receives status notification data and cost notification data, as well as communication data. The only costs considered in the second embodiment, however, are the basic path and link costs, as shown in FIG. 7; there are no additional costs such as the first, second, and third added costs used in the first embodiment.

The second embodiment lets each node choose its parent node on the basis of four principles: 1) avoid choosing a node having no child node if possible; 2) prefer a node having more child nodes; 3) prefer a node having more neighboring nodes; 4) prefer a node with a smaller cost. Any procedure may be used provided it is based on these four principles. In a variation of the second embodiment, a subset of the four principles is used, including principle 4) and one or more of principles 1) to 3).

An exemplary parent-node decision procedure carried out by a wireless terminal in the second embodiment will be described with reference to the flowchart in FIG. 12. The internal structure of the wireless terminals in the second embodiment is similar to the structure in the first embodiment.

Figure 12:
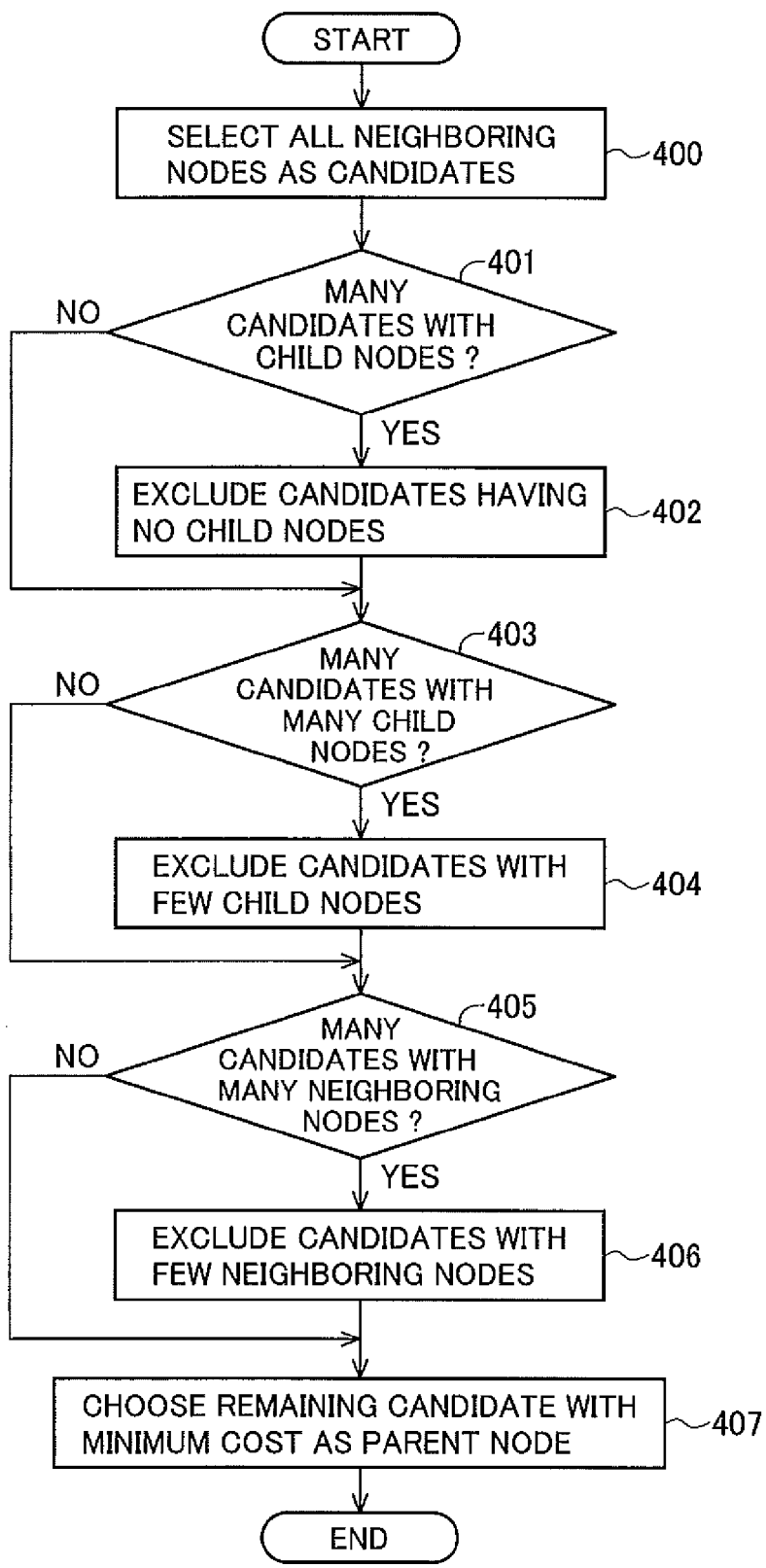
FIG. 12 is a flowchart illustrating the parent-node decision process at a wireless terminal in a second embodiment.

A wireless terminal in the second embodiment starts the procedure shown in FIG. 12 at each timing at which it is to choose a new parent node.

First, the wireless terminal selects all its neighboring nodes as candidates for parenthood (step 400). Then it determines whether or not the number of candidates having one or more child nodes constitutes at least a first prescribed fraction of the total number of candidates, or is at least a first prescribed number regardless of the total number of candidates (step 401). If the number of candidates having one or more child nodes is at least the first prescribed fraction or number, the wireless terminal excludes those candidates having no child nodes from the candidate group. If the number of candidates having one or more child nodes is less than the first prescribed fraction or number, all candidates remain in the candidate group.

Next, the wireless terminal determines whether or not the number of candidates having the first to n-th highest numbers of child nodes constitutes at least a second prescribed fraction of the total number of candidates (or is at least a second prescribed number regardless of the total number of candidates) at that point (step 403). The value of n may be one or two, for example. If the number of candidates with the first to n-th highest numbers of child nodes is at least the second prescribed fraction or number, the wireless terminal excludes the candidates that have the (n+1)-th highest and lower numbers of child nodes from the candidate group (step 404). If the number of candidates having up to the n-th highest number of child nodes is less than the second prescribed fraction or number, the candidate group remains unchanged.

Next, the wireless terminal determines whether or not the number of candidates having the first to m-th highest number of neighboring nodes constitutes at least a third prescribed fraction of the total number of candidates (or is at least a third prescribed number regardless of the total number of candidates) at that point (step 405). The value of m may be one or two, for example. If the number of candidates having the first to m-th highest number of neighboring nodes is at least the third prescribed fraction or number, the wireless terminal excludes the candidates having the (m+1)-th highest and lower numbers of neighboring nodes from the candidate group (step 406). If the number of candidates having the first to the m-th highest number of child nodes is less than the third prescribed fraction or number, the candidate group remains unchanged.

Next, the wireless terminal compares the costs of the candidates remaining in the candidate group and chooses a candidate with minimum cost as its parent node (step 407), thereby completing the procedure in FIG. 12.

The added cost scheme in the first embodiment also takes the four principles given above into consideration, but it considers them all at once in determining the total cost (evaluation value) used for the parent-node decision, while the second embodiment uses the four principles sequentially to narrow the candidates down to an optimal parent node.

Since use of the four principles is common to both the first and second embodiments, the second embodiment produces substantially the same effects as the first embodiment.

Third Embodiment

The wireless terminal, parent-node decision method, and wireless network in a third embodiment will now be described.

Whereas a wireless terminal chooses a single parent node in the first and second embodiments, it chooses two parent nodes in the third embodiment. One of the two parent nodes is an active parent node that is used normally, while the other is a back-up parent node that substitutes for the active parent node if a malfunction occurs at the active parent node or communication with the active parent node is lost.

The reason for choosing active and back-up parent nodes simultaneously in the third embodiment is as follows.

In the first and second embodiments, since each wireless terminal chooses only one parent node, if it loses contact with its chosen parent node for any reason, it must choose another parent node to serve as its router. The first and second embodiments minimize the number of routers, however, so there is a reduced probability that any other neighboring wireless terminal will already be a router.

In a wireless network with plenty of routers, such as the network shown in FIG. 1A, for example, when a new parent node is chosen, the chosen node will often already be a router. For example, if node 125 loses its link with its parent node 119, it can choose router node 120 as a new parent. In a wireless network configured according to the first or second embodiment, however, such as the network shown in FIG. 1B, for example, more of the wireless terminals are end devices, so the probability that the node chosen by a wireless node as its new parent node will be an end device increases. For example, if node 125 loses its link with its parent node 119, it has to choose an end-device node 120 or 124 as its new parent node.

However, as described earlier, an end device performs sleep control, so its receiving and transmitting circuits are not always powered up. Accordingly, in order to relay data through an end device chosen as a new parent node, the wireless terminal must first transmit status notification data, communication data, etc. to the end device to check that the end device is not asleep, and then send the end device certain data, such as status notification data, to make the end device change from being an end device to being a router. Switching parent nodes when a failure occurs can therefore take considerable time.

The third embodiment is directed toward a wireless network in which it would be inconvenient to spend much time switching parent nodes in case of a failure. When a wireless terminal chooses an active parent node, it also chooses a back-up parent node, and the back-up parent node is barred from performing sleep control even when the active parent node and its communication link are functioning normally and the back-up parent node is not used. In particular, even if the chosen back-up parent node is an end device having no child nodes, the back-up parent node remains awake throughout the time during which the active parent node is functioning. Then if the active parent node or its link fails, the wireless terminal can switch over to the back-up parent node immediately, without having to check whether the back-up parent node is asleep or awake.

The third embodiment will now be described in more detail, focusing on the differences from the first and second embodiments due to the use of both active and back-up parent nodes.

In the third embodiment, the local tree information defining the functions of the neighboring nodes of a wireless terminal indicates its active parent node, its back-up parent node, child nodes (active child nodes) that have chosen the wireless terminal as their active parent node, and child nodes (back-up child nodes) that have chosen the wireless terminal as their back-up parent node. For example, if a tabular representation of the local tree information, as in FIG. 4, is used in the third embodiment, whether each node is the active parent node, the back-up parent node, an active child node, or a back-up child node of the wireless terminal is indicated in the parent-child field. Similar information is also entered in the next neighboring node field.

The status notification data in the third embodiment are taken from the neighboring node field and parent-child field in the local tree information, so the neighboring nodes are also notified of active and back-up parent node selections, and active and back-up child nodes.

In the third embodiment, path costs are calculated in the same way as in the first or second embodiment, except that a wireless terminal calculates its path cost by adding the cost of its link with the back-up parent node to the path cost of the back-up node. Thus node 117 in FIG. 13, as described later, calculates its own cost from the cost of its back-up parent node 118, rather than the cost of its active parent node 112. Added costs, if used, may be based only on active child nodes, or on all child nodes, without distinction between active and back-up.

Each wireless terminal in this embodiment performs the same parent-node decision process as in the first or second embodiment, choosing, for example, the best candidate as its active parent node and the second-best candidate as its back-up parent node.

When a wireless terminal finds, by exchanging status notification data with its neighboring nodes, that it is not the active parent node of any neighboring node but is the back-up parent node of some neighboring node, its power control unit 303 switches into an operating mode without sleep control, and in that sense the wireless terminal becomes a router. Since the wireless terminal is not the active parent node of any neighboring node, it also operates in a non-relaying mode, in which sense it remains an end node. Alternatively, it switches into a relaying mode, but since no data to be relayed arrive, no relaying operations are actually performed. When such a node is notified from a neighboring node, for which it is operating as a back-up parent node, of an operational problem at the neighboring node's active parent node, or is simply informed by the neighboring node that it has been selected as a new active parent node, the wireless terminal switches over to the relaying mode and actually begins to function as a router by relaying communications from the neighboring node.

In the third embodiment, only a node that recognizes that it is not the active or back-up parent node of any neighboring node can perform sleep control as an end device.

A wireless network configured according to the third embodiment will now be described with reference to FIG. 13.

Figure 13:
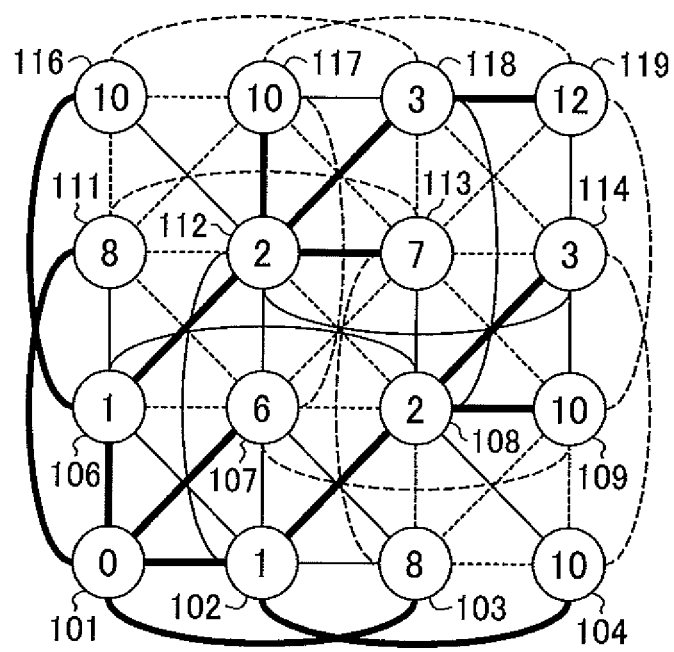
FIG. 13 illustrates a wireless network topology configured according to a third embodiment.

In FIG. 13, a bold solid line is a link between an active parent node and an active child node, the node with the lower cost (indicated by the numeric value in the circle) being the active parent node. A thin solid line is a link between a back-up parent node and a back-up child node. A dotted line indicates nodes that are within mutual communication range and exchange status and cost notification data, but do not transmit communication data to each another.

For example, the active parent node of node 108 is node 102, and the back-up parent node of node 108 is node 113. The active child nodes of node 108 are nodes 109 and 114; the back-up child nodes of node 108 are nodes 104 and 118. If node 118 loses contact with its active parent node 112 because of a malfunction at node 112 or a link failure, node 113 immediately switches over to its back-up parent node 108, which then becomes its active parent node.

Similarly, if node 119 loses contact with its active parent node 118, node 119 immediately switches over to use its back-up parent node 114 as its active parent node. In the first and second embodiments, node 114 is an end device and might be asleep, but in the third embodiment, since node 114 has been selected as a back-up parent node, it does not perform sleep control and can immediately start operating as an active parent node.

In the example in FIG. 13 the nodes that must always remain awake are nodes 101, 102, 106, 108, 112, 114, and 118. When all nodes communicate through their active parent nodes, node 114 need not actually relay any data, but it is selected as the back-up parent node of nodes 109 and 119, so it cannot sleep.

The third embodiment chooses active and back-up parent nodes on the basis of the same principles as used in the first and second embodiments, and accordingly achieves a reduction in the number of routers and in overall network power consumption. Less than half the nodes in FIG. 13 are routers, as compared with more than half in FIG. 1A.

Although the third embodiment produces more routers than the first and second embodiments, when node or link failures occur, switching from an active to a back-up parent node takes place promptly, which enables the wireless network to keep operating with practically no disruption. Communication delays due to node and link failures can therefore be avoided.

Some variations of the preceding embodiments will now be described.

In the third embodiment, instead of choosing only a single back-up parent node, it is possible to choose a ranked plurality of back-up parent nodes. In this case, each wireless terminal calculates its own cost by adding the link cost of its link with the back-up parent node having the highest cost (lowest rank) to the cost of that back-up parent node.

In choosing a plurality of parent nodes, if a wireless terminal cannot choose the prescribed number of parent nodes due to lack of neighboring nodes, it chooses as many parent nodes as possible. In that case, the wireless terminal adds an added cost according to the deficient number of parent nodes to its cost so as not to be easily chosen as a parent node.

Instead of classifying the plurality of parent nodes used in the third embodiment as active and back-up parent nodes, a child node may choose an arbitrary one of its parent nodes to use each time it communicates, or at other appropriate timings.

The link costs need not be all the same as in the first to third embodiments. The link cost may be set on the basis of ease of communication or other factors. For example, when each wireless terminal transmits with identical transmitting power, the electric field strength of the signal received from each neighboring node may be measured and the ratio (e.g., to the first decimal place) of the measured value to a preset reference field strength value may be used as the link cost. Another possibility is to assign different costs to different ranges of received electric field strengths and determine the link cost on the basis of the range to which the measured electric field strength belongs. If the receiving circuit includes an automatic gain control (AGC) circuit, an AGC control signal may be used instead of the received electric field strength.

In the above embodiments, the receiving wireless terminal adds the link cost, but the transmitting wireless terminal may add the link cost and transmit the result. The language of the appended claims is intended to include this scheme.

In the parent-node decision process in the above embodiments, a wireless terminal with a smaller cost has a higher probability of being chosen as a parent node, but conversely a wireless terminal with a larger value of some other parameter may have a higher probability of being chosen as a parent node. The language of the appended claims is intended to include this variation.

In the above embodiments, parent-node decisions are performed at all wireless terminals other than the root node to configure the tree topology of the network, but the tree topology may be established by a separate network configuration device by the methods described in the above embodiments, and information about parent and child nodes may be supplied from that device to each of the wireless terminals. For example, the network configuration device may be connected to the root node, may collect information from the wireless terminals about their neighboring nodes, and may use the collected information to reconfigure a pre-existing network configuration according to the methods described in the above embodiments, the pre-existing configuration having been stored previously in the network configuration device.

Those skilled in the art will recognize that further variations are possible within the scope of the invention, which is defined in the appended claims.

What is claimed is:

1. A wireless terminal functioning as a node in a wireless network with a tree topology having a root node, each node in the wireless network other than the root node having a neighboring node functioning as a parent node the each node other than the root node functioning as a child node of the parent node, communications sent toward the root node being routed from child node to parent node, communications from the root node being routed from parent node to child node, the wireless terminal comprising:

a selection value receiver for receiving selection values transmitted by neighboring nodes in the wireless network;

a local structural information store for holding local structural information about a local part of the wireless network, the local part including the wireless terminal, and exchanging at least parts of the local structural information with the neighboring nodes;

a parent node decision unit for selecting one of the neighboring nodes as the parent node of the wireless terminal on a basis of the selection values, wherein the local structural information is used to favor neighboring nodes having at least one child node other than the wireless terminal for selection as the parent node;

a terminal selection value transmitter for transmitting a selection value based on the selected parent node to the neighboring nodes of the wireless terminal; and a selection value processing unit for modifying the selection values received by the selection value receiver from the neighboring nodes by adding an enhancement value that makes neighboring nodes having at least one child node other than the wireless terminal, as indicated by the local structural information, more likely to be selected as the parent node of the wireless terminal, wherein:

the parent node decision unit selects the parent node on the basis of magnitudes of the modified selection values, the terminal selection value transmitter transmits the modified selection value of the selected parent node to the neighboring nodes of the wireless terminal, the parent node decision unit selects a neighboring node of minimum modified selection value as the parent node, and the enhancement value added to the selection value received from each neighboring node decreases as the number of child nodes of the respective neighboring node increases.

2. A wireless terminal functioning as a node in a wireless network with a tree topology having a root node, each node in the wireless network other than the root node having a neighboring node functioning as a parent node, the each node other than the root node functioning as a child node of the parent node, wherein communications sent toward the root node being routed from child node to parent node, and communications from the root node being routed from parent node to child node, the wireless terminal comprising:

a selection value receiver for receiving selection values transmitted by neighboring nodes in the wireless network;

a local structural information store for holding local structural information about a local part of the wireless network, the local part including the wireless terminal, and exchanging at least parts of the local structural information with the neighboring nodes of the wireless terminal;

a parent node decision unit for selecting one of the neighboring nodes as the parent node of the wireless terminal on a basis of the selection values, also the local structural information to favor neighboring nodes having at least one child node other than the wireless terminal for selection as the parent node;

a terminal selection value transmitter for transmitting a selection value based on the selected parent node to the neighboring nodes of the wireless terminal; and a selection value processing unit for modifying the selection values received by the selection value receiver from the neighboring nodes by adding an enhancement value that makes neighboring nodes having at least one child node other than the wireless terminal, as indicated by the local structural information, more likely to be selected as the parent node of the wireless terminal, wherein:

the parent node decision unit selects the parent node on the basis of magnitudes of the modified selection values, the terminal selection value transmitter transmits the modified selection value of the selected parent node to the neighboring nodes of the wireless terminal, the parent node decision unit selects a neighboring node of minimum modified selection value as the parent node, and the enhancement value added to the selection value received from each neighboring node decreases as the number of neighboring nodes of the respective neighboring node increases.

3. A wireless terminal functioning as a node in a wireless network with a tree topology having a root node, each node in the wireless network other than the root node having a neighboring node functioning as a parent node, the each node other than the root node functioning as a child node of the parent node, communications sent toward the root node being routed from child node to parent node, communications from the root node being routed from parent node to child node, the wireless terminal comprising:

a selection value receiver for receiving selection values transmitted by neighboring nodes in the wireless network;

a local structural information store for holding local structural information about a local part of the wireless network, the local part including the wireless terminal, and exchanging at least parts of the local structural information with the neighboring nodes;

a parent node decision unit for selecting one of the neighboring nodes as the parent node of the wireless terminal on a basis of the selection values, the local structural information to favor neighboring nodes having at least one child node other than the wireless terminal for selection as the parent node; and a terminal selection value transmitter for transmitting a selection value based on the selected parent node to the neighboring nodes of the wireless terminal, wherein the parent node decision unit selects a prescribed number of parent nodes, the prescribed number being greater than one;

further comprising a selection value processing unit for modifying the selection values received by the selection value receiver from the neighboring nodes by adding an enhancement value that makes neighboring nodes having at least one child node, other than the wireless terminal, as indicated by the local structural information, more likely to be selected as the parent node of the wireless terminal, wherein the parent node decision unit selects neighboring nodes of least modified selection values as the parent nodes.

4. The wireless terminal of claim 3, wherein the terminal selection value transmitter transmits the greatest modified selection value of a plurality of parent nodes.

5. The wireless terminal of claim 3, wherein the terminal selection value transmitter further modifies the transmitted modified selection value, thereby making the wireless terminal itself less likely to be selected as a parent node of a neighboring node, when the parent node decision unit is unable to select the prescribed number of parent nodes.

6. A method of configuring a tree topology in a wireless network having a root node, the wireless network having a wireless terminal functioning as a node, each node in the wireless network other than the root node having a neighboring node functioning as a parent node, the each node other than the root node functioning as a child node of the parent node, communications sent toward the root node being routed from child node to parent node, communications from the root node being routed from parent node to child node, the method comprising the steps of:

receiving receiver selection values transmitted by neighboring nodes in the wireless network;

holding local structural information about a local part of the wireless network in a local structural information store, the local part including the wireless terminal;

exchanging by the local part of the wireless network at least parts of the local structural information with the neighboring nodes;

selecting one of the neighboring nodes as the parent node of the wireless terminal on a basis of the selection values, wherein the local structural information is used to favor neighboring nodes having at least one child node other than the wireless terminal for selection as the parent node;

transmitting a selection value based on the selected parent node to the neighboring nodes of the wireless terminal;

modifying the received selection values received from the neighboring nodes by adding an enhancement value that makes neighboring nodes having at least one child node other than the wireless terminal, as indicated by the local structural information, more likely to be selected as the parent node of the wireless terminal;

selecting the parent node on the basis of magnitudes of the modified selection values;

transmitting the modified selection value of the selected parent node to the neighboring nodes; and selecting as the parent node a neighboring node of minimum modified selection value;

wherein the enhancement value added to the selection value received from each neighboring node decreases as the number of child nodes of the neighboring node increases.

7. A method of configuring a tree topology in a wireless network having a root node, the wireless network having a wireless terminal functioning as a node, each node in the wireless network other than the root node having a neighboring node functioning as a parent node, the each node other than the root node functioning as a child node of the parent node, communications sent toward the root node being routed from child node to parent node, communications from the root node being routed from parent node to child node, the method comprising the steps of:

receiving receiver selection values transmitted by neighboring nodes in the wireless network;

holding local structural information about a local part of the wireless network in a local structural information store, the local part including the wireless terminal;

exchanging by the local part of the wireless network at least parts of the local structural information with the neighboring nodes;

selecting one of the neighboring nodes as the parent node of the wireless terminal on a basis of the selection values, wherein the local structural information is used to favor neighboring nodes having at least one child node other than the wireless terminal for selection as the parent node;

transmitting a selection value based on the selected parent node to the neighboring nodes;

modifying the received selection values received from the neighboring nodes by adding an enhancement value that makes neighboring nodes having at least one child node other than the wireless terminal, as indicated by the local structural information, more likely to be selected as the parent node of the wireless terminal;

selecting the parent node on the basis of magnitudes of the modified selection values;

transmitting the modified selection value of the selected parent node to the neighboring nodes of the wireless terminal; and selecting as the parent node a neighboring node of minimum modified selection value;

wherein the enhancement value added to the selection value received from each neighboring node decreases as the number of neighboring nodes of the neighboring node increases.

8. A method of configuring a tree topology in a wireless network having a root node, the wireless network having a wireless terminal functioning as a node, each node in the wireless network other than the root node having a neighboring node functioning as a parent node, the each node other than the root node functioning as a child node of the parent node, communications sent toward the root node being routed from child node to parent node, communications from the root node being routed from parent node to child node, the method comprising the steps of:

receiving receiver selection values transmitted by neighboring nodes in the wireless network;

holding local structural information about a local part of the wireless network in a local structural information store, the local part including the wireless terminal;

exchanging by the local part of the wireless network at least parts of the local structural information with the neighboring nodes;

selecting one of the neighboring nodes as the parent node of the wireless terminal on a basis of the selection values, using the local structural information to favor neighboring nodes having at least one child node other than the wireless terminal for selection as the parent node;

transmitting a selection value based on the selected parent node to the neighboring nodes of the wireless terminal;

modifying the received selection values received from the neighboring nodes by adding an enhancement value that makes neighboring nodes having at least one child node other than the wireless terminal, as indicated by the local structural information, more likely to be selected as the parent node of the wireless terminal;

selecting the parent node on the basis of magnitudes of the modified selection values;

transmitting the modified selection value of the selected parent node to the neighboring nodes of the wireless terminal;

selecting as the parent node a neighboring node of minimum modified selection value; and modifying the selection values received from the neighboring nodes by adding an enhancement value that makes neighboring nodes having at least one child node, other than the wireless terminal, as indicated by the local structural information, more likely to be selected as the parent node of the wireless terminal, wherein the neighboring nodes selects as the parent nodes are the neighboring nodes of least modified selection values.

9. The method of claim 8, wherein said step of transmitting the modified selection value of the selected parent node to the neighboring nodes includes transmitting the greatest modified selection value of a plurality of parent nodes.

10. The wireless terminal of claim 8, wherein said step of transmitting the modified selection value of the selected parent node to the neighboring nodes includes modifying the transmitted modified selection value, thereby making the wireless terminal itself less likely to be selected as a parent node of a neighboring node, when a prescribed number of parent nodes cannot be selected.

\* \* \* \* \*